United States Patent [19]
Herndon et al.

[11] Patent Number: 5,305,467
[45] Date of Patent: Apr. 19, 1994

[54] LOCAL AREA NETWORK FOR FLEXIBLE DIGITAL COMMUNICATIONS WITHIN AND BETWEEN RF BASE STATIONS

[75] Inventors: Charles C. Herndon, Forest; John R. Martin, Lynchburg; Rodney L. Nickel, Lynchburg; Daniel I. Schwed, Lynchburg; Claude L. Vignali, Forest, all of Va.

[73] Assignee: Ericsson GE Mobile Communications Inc., Lynchburg, Va.

[21] Appl. No.: 620,423

[22] Filed: Dec. 3, 1990

[51] Int. Cl.$^5$ .............................. H04B 3/00
[52] U.S. Cl. ..................... 455/56.1; 455/67.1; 370/85.1; 379/58
[58] Field of Search ............ 455/73, 75, 89, 5.1, 455/56.1, 34.1, 33.1, 54.1, 53.1, 67.1, 49.1, 38.1; 370/95.1, 85.1, 85.2, 85.3; 379/58; 375/36; 340/825.52

[56] References Cited

U.S. PATENT DOCUMENTS

| | | | |
|---|---|---|---|
| 4,584,678 | 4/1986 | Ozeki et al. | 370/85.3 |
| 4,587,651 | 5/1986 | Nelson et al. | 370/85.13 |
| 4,590,472 | 5/1986 | Benson et al. | |
| 4,593,155 | 6/1986 | Hawkins | 455/89 |
| 4,608,700 | 8/1986 | Kirtley, Jr. et al. | 370/85.2 |
| 4,636,791 | 1/1987 | Burke et al. | |
| 4,667,191 | 5/1987 | Comroe et al. | 455/73 |
| 4,684,941 | 8/1987 | Smith | 340/825.52 |
| 4,686,671 | 8/1987 | Burian et al. | 455/34.1 |
| 4,726,050 | 2/1988 | Menich | 455/33 |
| 4,730,187 | 3/1988 | Menich et al. | |
| 4,789,983 | 12/1988 | Acampora et al. | 370/84 |
| 4,866,710 | 9/1989 | Schaeffer | 455/33 |
| 4,903,262 | 2/1990 | Dissosway et al. | |
| 4,918,746 | 8/1990 | Serizawa | 455/56.1 |
| 4,993,059 | 2/1991 | Smith | 455/33 |
| 5,081,641 | 1/1992 | Kotzin et al. | 455/33.1 |

FOREIGN PATENT DOCUMENTS

3638735 5/1988 Fed. Rep. of Germany ........ 455/89

*Primary Examiner*—Reinhard J. Eisenzopf
*Assistant Examiner*—Chi Pham
*Attorney, Agent, or Firm*—Nixon & Vanderhye

[57] ABSTRACT

A LAN multi-node generic digital signal communications link within a radio frequency (RF) base station system communicates control signals within and between base stations. The generic digital signal link eliminates the use of multiple lines for respective functions by using the same generic communications interface for various different functions. By using such a generic digital signal link for inter and intra base station communications, RF and auxiliary control become standardized—reducing complexity in the product, in the documentation and in field repair techniques.

10 Claims, 7 Drawing Sheets

Fig. 3 INTERFACE MODULE

Fig. 4

CONTROLLER 28

*Fig. 5A*

INTERFACE MODULE

*Fig. 5B*

LOCAL AREA NETWORK FOR FLEXIBLE DIGITAL COMMUNICATIONS WITHIN AND BETWEEN RF BASE STATIONS

CROSS-REFERENCES TO RELATED APPLICATIONS

This application is related to the following commonly-assigned copending patent applications (all of the disclosures of which are hereby incorporated by reference herein):

U.S. application Ser. No. 07/596,357 now abandoned of Vignali et al filed Oct. 12, 1990 entitled "A Full Duplex RF Repeater/Base Station Providing Microprocessor-controlled Simultaneous CTCSS Tone Encode/Decode";

U.S. application Ser. No. 07/620,422 now abandoned of Herndon et al filed concurrently herewith entitled "Remote Control of RF Base Station Via Digital Communications"; and U.S. application Ser. No. 07/620,421 of Nickel al al filed concurrently herewith entitled "Digital Signal Processor for Radio Base Station".

FIELD OF THE INVENTION

The present invention relates to radio frequency (RF) repeating type transceivers of the type which transmit and receive radio frequency signals, and more particularly to so-called Base Station RF transceivers. Still more particularly, the present invention relates to techniques and arrangements for communicating digital control signals within and between such RF base stations.

BACKGROUND AND SUMMARY OF THE INVENTION

Many modern radio frequency (RF) base stations have separate RF and control sections. A base station RF section typically includes mostly analog circuitry (e.g., RF amplifiers, RF oscillators, RF and IF receiver amplifiers/filters, etc.) Most modern RF base stations available today control such an RF section with a digital (e.g., microprocessor based) control section. Such a digital control section can provide expanded control capabilities and flexibility, thereby providing many advantages over prior analog control circuit arrangements.

As is well known, digital circuits are not particularly compatible with RF signals. The RF section of a base station is therefore almost always housed in a separate shielded enclosure to prevent RF signals radiated directly by the power amplifier and other components therein from reaching the sensitive digital circuitry and vice versa (digital circuitry getting into receiver).

Interconnecting the RF section with the control section is typically a relatively difficult and significant problem. A relatively large number of signals must pass between the RF section and the control section. For example, the control section may typically program the operating frequencies of the transmitter and the receiver within the RF section and may also directly control various other parameters of RF section operation (e.g., whether or not the transmitter is keyed, the state of an RF antenna relay, the transmitter final amplifier power output, etc.). In addition, the control section must monitor various status and other parameters provided by the RF section in order to ascertain the state of operation of the RF section. For example, the control section may monitor received signal strength and/or carrier detect, DC input current to the transmitter final amplifier, etc.).

In the past, such control and status signals have been communicated between the control section and the RF section over an array of dedicated parallel conductors. One typical configuration used in the past was to provide the RF section and the control section each with a multipin connector. A multiconductor cable (or, in some cases, a bus backplane) was used to convey, in parallel, all of the various signals that needed to be communicated between the RF section and the control section. For example, one or more conductors might be dedicated to carrying a signal generated by the control section for controlling whether or not the transmitter in the RF section is keyed; one or more further conductors might be dedicated to carrying frequency programming control signals from the control section to the receiver frequency synthesizer in the RF section, one or more still further conductors might be dedicated to carrying control signals from the control section for programming the transmitter frequency synthesizer, etc.).

Although such dedicated parallel conductor-type interconnection arrangements work, they have certain disadvantages. One disadvantage of such prior art interconnection arrangements is the relatively high cost. Multipin connectors and associated cables are expensive. Moreover, since radio frequency signals and digital control signals are not compatible with one another, precautions must be taken to minimize RF currents flowing on each such conductor. Each such conductor had to be "RF decoupled" at both the RF section end and the control section end using RF shunting and/or bypass networks (e.g., series-connected RF chokes and shunt-to-ground decoupling capacitors). Since each individual conductor had to include an RF decoupling network at each end, RF decoupling added significantly to the cost and complexity of the base station.

In addition, such parallel dedicated conductor interconnections created reliability and service problems. Reliability problems are created whenever an additional mechanical-type electrical connection is introduced. Such connections can corrode or otherwise mechanically deteriorate, degrading or destroying critical interconnections between the RF section and the control section. Preventive maintenance efforts had to be expended to ensure such connections were properly maintained. As the number of conductors increased, the complexity of testing for and isolating base stations faults also increased (thus increasing down time and service time).

Still further complexity is introduced by the requirement that most RF base stations must supply their customers with a wide variety of different base station options. The Federal Communications Commission authorizes base station operation on a user-by-user basis. Such authorizations specify different operating frequencies for different users, and may typically also specify different RF output powers for different users. One user may be authorized to operate with only, say, 100 watts of RF power, where as another user may be authorized to operate with several hundred watts of output power (different antenna configuration can also affect the power output required by a base station transmitter). The user needing only relatively low output power should not have to buy a base station having relatively high RF output power capability, since the high-powered components are generally more expensive and drastically increase the cost of the base station. Thus, for marketing and other reasons, base station manufacturers found it necessary to provide different RF output power options for their base stations. Similarly, different users may be assigned by the FCC to operate on completely different bands within the RF spectrum. RF circuitry designed for operation on a relatively low (e.g., several hundred megahertz) RF frequency is not capable of operating at high (e.g., 800 or 900 MH) RF frequencies. Accordingly, to meet the needs of a wide variety of users, a base station manufacturer must provide different base stations for different operating bands and for different power output levels.

Perhaps the most economic way for a base station manufacturer to meet such a wide variety of customer needs is to make different RF sections for different RF output powers, frequencies of operation, etc., and to make his control section mostly generic with respect to all such different RF sections. Thus, each of the RF sections can be made to be "plug compatible" with the same control section. While such an arrangement is both possible and practical, it introduces further complexities. Providing such a generic parallel interconnection interface so that the control section may interface with any RF section usually requires the control interface to provide a set of conductors that is a superset of conductors needed by any specific section. For example, unless very carefully designed so that all of the RF sections receive and provide the same control and status signals, some RF sections will not use some of the parallel connections provided to it. In order to accommodate the many different system configurations that are possible, the amount of I/O became large and very difficult to maintain and understand. Moreover, such careful design to provide generic parallel dedicated conductor interface is difficult and expensive and also may hamper further system expansion. Once the interface has been designed and manufactured, it is virtually impossible to add additional signal lines (e.g., to add further options or capabilities in response to customer demand) without significant redesign and remanufacturing efforts. Also, since the I/O lines were dedicated and implemented in hardware, implementation was costly and changes were very difficult.

Of course, much work has been done in the field of digital signal communications. For example, local area networks (LANS) are used throughout the world to link computers together. In addition, serial digital communications protocols and conventions have become relatively standardized. As one example, the pervasive standardized RS-232C serial digital signal interface is commonly used to connect a digital processor to another digital processor or to a peripheral.

Moreover, some microprocessor manufacturers have begun providing LAN software and associated hardware interfaces on-chip. As one example, the Intel 80C152 microprocessor includes a Global Serial Channel (GSC) which is a multi-protocol high performance serial interface targeted for data rates up to two megabits per second with on-chip clock recovery. The 80C152 implements the Data Link Layer and the Physical Link Layer as described in the ISO reference model for open systems interconnection. The GSC provided on Intel's 80C152 was optimized to implement the Carrier Sense Multi-Access with Collision Detection (CSMA/CD) protocol, and was designed specifically to allow standard baud rates (such as the proposed IEEE 802.3 LAN Standard 1.0 MBps). The Intel 80C152 was thus designed to make it possible to implement a LAN by merely more or less directly interconnecting 80C152 microcontrollers together (using appropriate transceiver ICs to transmit and receive the serial data).

Digital signal serial links are not unknown in the world of RF systems. For example, it is generally known to interconnect a digital controller with RF components within a mobile radio transceiver using a serial communications link. See, for example, U.S. Pat. No. 4,903,262 issued 20 Feb. 1990 entitled "Hardware Interface and Protocol for A Mobile Radio Transceiver"; and copending divisional application thereof Ser. No. 07/449,790 filed 15 Dec. 1989 now U.S. Pat. No. 5,109,543. See also U.S. Pat. No. 4,590,472 to Benson et al; U.S. Pat. No. 4,636,791 to Burke et al; and U.S. Pat. No. 4,684,941 to Smith et al. In addition, commonly assigned U.S. patent application Ser. No. 07/532,164 filed 5 Jun. 1990 now U.S. Pat. No. 5,175,866 entitled "Fail-Soft Architecture for Public Trunking System" describes a trunked RF repeater arrangement wherein various "trunking cards" each controlling an RF transceiver are linked together and with a dispatch console via a common "backup serial link." Base stations are now available that use multiple and dedicated relatively low-speed I/O for RF control, but such I/O arrangements are relatively inflexible and have no facilities for inter base station communications.

The present invention solves many of the problems mentioned above by providing a generic digital control signal link for communicating digital control signals within and between RF base stations. This new arrangement for communicating control signals within and between base stations practically reduces the number of separate interconnections between base station components, standardizes the way such components communicate with one another, allows single-point monitoring of an entire system (e.g., comprising one or many RF base stations), increases reliability, and reduces hardware complexity and cost.

The generic digital signal link provided by the present invention also eliminates the use of multiple lines for respective functions by using the same lines for various different functions depending upon requirements. By using such a generic digital signal link for inter and intra base station communications, RF and auxiliary control become standardized—reducing complexity in the product, in the documentation and in field repair techniques.

In the preferred embodiment in accordance with the present invention, the generic digital signal link is implemented using a multipoint communication architecture (e.g., EIA RS-485) with a Local Area Network (LAN) communications protocol. Many system components may be connected to the same link with no impact on system hardware performance. This permits the same link used for control interface between components (e.g., the control section and an RF section) within a base station to also be used for communicating with components and systems external to the base station. The generic link provides virtually unlimited expansion capabilities e.g., (only software changes are required to adapt the system for a completely new system component) and thus provides an expandability never before available in RF base station architectures.

In the preferred embodiment, the generic digital signal link is used for programming transmitter and receiver local oscillator synthesizers and is also used to transmit fault status signals from the RF section to the control section. This same link is additionally used to permit the control section to control the transmitter power amplifier output level. Due to its expandability, the very same generic digital signal link can be used to interface and interconnect with various trunking system components within the base station (e.g., voter system components, voice guard system components, auxiliary receivers, etc.). In addition, the very same generic digital signal link can be used to interconnect multiple base stations together (e.g., to implement a distributed control architecture or to otherwise provide centralized or distributed control capabilities) and/or to an external control and/or monitoring facility (e.g., a single-point monitor for overall system diagnostic, fault and operating parameter monitoring). While processors or other digital signal circuitry within various LAN nodes may perform significant processing if desired, in at least one configuration most such processors may provide mostly LAN communications support—thus simplifying system software design.

BRIEF DESCRIPTION OF THE DRAWINGS

These and other features and advantages of the present invention will be more completely understood by referring to the following detailed description of the presently preferred exemplary embodiment in conjunction with the attached figures, of which.

DETAILED DESCRIPTION OF A PRESENTLY PREFERRED EXEMPLARY EMBODIMENT

Figure 1:
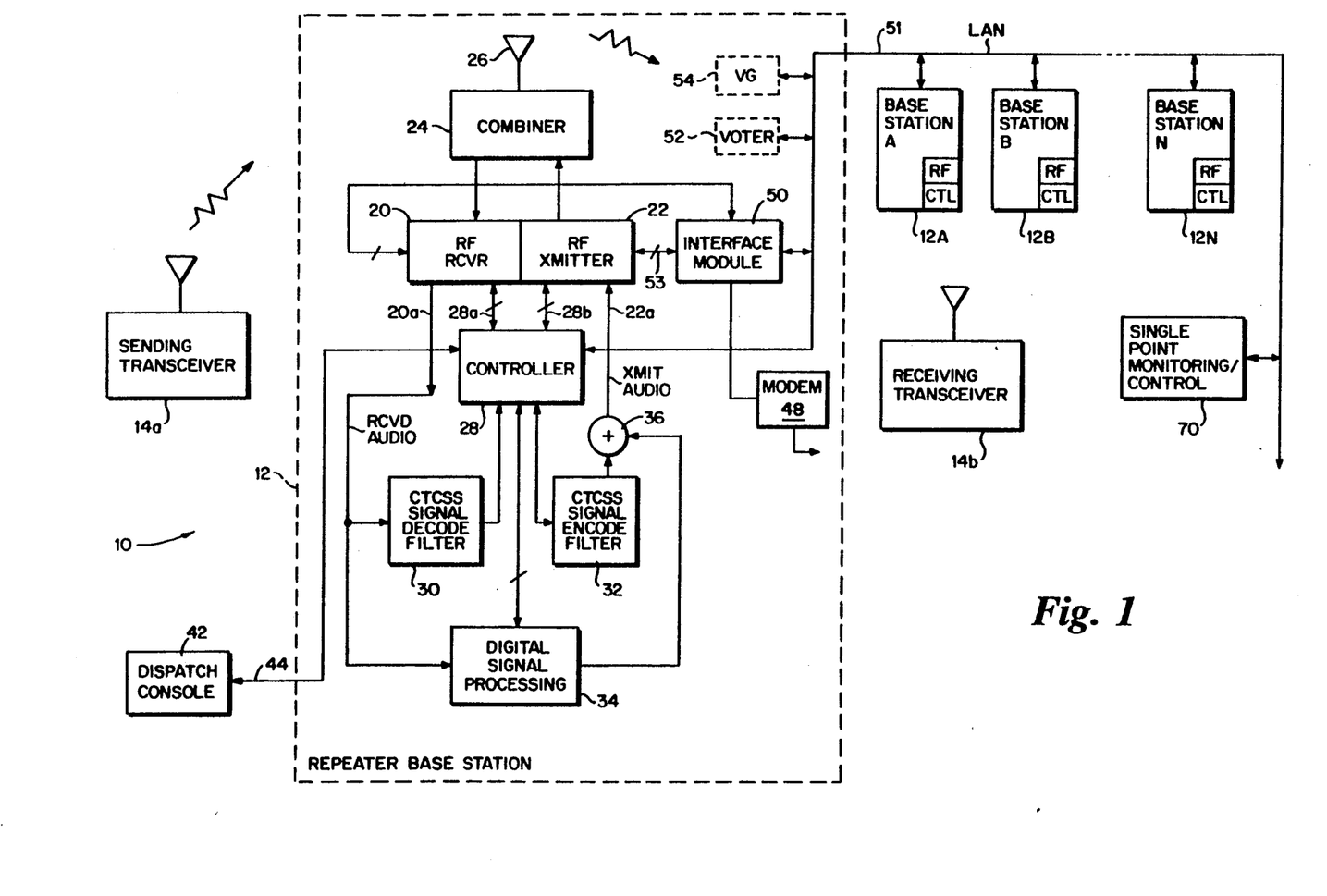
FIG. 1 is a schematic block diagram of an exemplary presently preferred embodiment of an RF base station system in accordance with the present invention.

FIG. 1 is a high level schematic block diagram of the presently preferred exemplary embodiment of a RF base station communications system 10 in accordance with the presently preferred exemplary embodiment of the present invention. System 10 in the preferred embodiment includes one (or more) repeater base stations 12 and user transceivers 14a, 14b. Repeater base station 12 receives an RF transmission from a transceiver 14a and retransmits/regenerates the received RF transmission so that it can be received by other user transceivers 14b.

Typically, base station 12 is located on top of a hill or a tall building and is equipped with a relatively high power RF transmitter 22—whereas user transceivers 14a, 14b may be located anywhere within a particular coverage area (e.g., behind obstructions, in valleys, or in "fringe" portions of the coverage area) and are typically equipped with relatively low power RF transmitters (e.g., to save battery power and to reduce costs). Thus, while geographically separated exemplary sending and receiving user transceivers 14a, 14b may be incapable of communicating with one another directly if simplex or other direct communications were attempted, communications may be reliably established between those two transceivers (and, typically, among a large group of such user transceivers) via repeater base station 12.

Repeater base station 12 in the preferred embodiment includes RF receiver 20, RF transmitter 22, a combiner 24 and antenna 26. In addition, repeater base station 12 in the preferred embodiment includes a controller 28 which performs operations under software control, a CTCSS signal decode filter 30, a CTCSS signal encode filter, and analog and/or digital signal processing block 34. Controller 28 communicates voice and control signals with a dispatch console 42 over a landline 44. A modem 48 may be used to communicate between base station 12 and a remote control station not shown.

In the preferred embodiment, base station 12 also includes a local area network (LAN) 51 for communicating digital data between components of the base station (and which may also be used to communicate with other base stations). LAN 51 provides a generic digital signal link interface for controller 28, permitting the controller to communicate with a variety of different devices (both within and outside of the base station 12) using the generic communications protocol, conventions and hardware described, for example, in Intel reference manuals entitled 83C152 *Universal Communications Control User's Manual* (1987); and Intel's 83C152 hardware description and data sheets found in *Eight-Bit-Embedded Controller Handbook* (Order no. 270645-002; 1990), beginning on page 9-1, both incorporated by reference herein.

For example, LAN 51 is used in the preferred embodiment to communicate between base station controller 28 and a base station interface module 50. Interface module 50, in turn, provides control signals to (and monitors status signals from) base station RF receiver 20 and base station transmitter 22. The interface module 50 may be regarded as an extension of the RF section 20,22 in the preferred embodiment.

In the preferred embodiment, for example, controller 28 controls the power output of RF transmitter 22 and the operating frequencies of both the transmitter and receiver 20 by sending standard protocol digital signal messages over LAN 51. For example, to load a digitally programmable local oscillator frequency synthesizer within transmitter 22, controller 28 transmits one or more messages over LAN 51 specifying a predetermined address corresponding to interface module 50 (along with a further address portion indicating to the interface module that the transmitter synthesizer is to be reloaded). The transmitted message(s) contain a digital value to be loaded into the transmitter synthesizer prescaler. The interface module 50 receives the message(s) from LAN 51 and loads the transmitter frequency synthesizer..with the data contents of the messages (as will be explained in greater detail shortly). Similar techniques are followed by controller 28 (but specifying different further address portions) to load the receiver 20 frequency synthesizer and to specify transmitter 22 RF power output.

In the preferred embodiment, controller 28 also is assigned a unique address and can thus receive messages transmitted to it over LAN 51. In the preferred embodiment, interface module 50 monitors certain status and error signals generated by receiver 20 and transmitter 22, and may periodically (or as commanded by controller 28 via a request message passed over LAN 51) send such monitored signals over LAN 51 in the form of messages directed to controller 28. Thus, LAN 51 in the preferred embodiment is a truly bidirectional digital signal link used to carry digital signals between controller 28 and interface module 50.

Since LAN 51 provides a multipoint communications architecture (and includes CSMA/CD collision detection and handling capabilities), LAN 51 can also be connected to any number of additional components within and/or outside of base station 12. For example, it may be desirable to include, within base station 12, a conventional digital voter 52 that receives RSSI (received signal strength indicator) signals from one or more satellite receiving sites and selects the "best" (or an acceptable) received signal for communication to dispatch console 42 and/or for repeating by transmitter 22. Such a voter 52 may communicate with and be controlled by controller 28 via LAN 51 (and thus via the same generic digital signal link used by controller 28 to communicate with interface module 50). As another example, the customer may require conventional voice encryption capabilities within base station 12 (in order to provide speech security). While such VOICE GUARD capabilities could be made available by installing a separate, largely independent VG (VOICE GUARD) module 54 within the base station 12 and by connecting dedicated control and status lines directly between the VG module and controller 28, in the presently preferred exemplary embodiment the VG module is connected to LAN 51 and thus communicates with controller 28 over the same generic digital signal link used by the controller to communicate with interface module 50. Similarly, any number of such additional modules may be added to base station 12 and flexibly connected with controller 28 (and other components of the base station) via LAN 51. New modules and components can be designed and flexibly added long after base station 12 has been installed in the field, and such expansion of the capabilities of the base station can be accommodated by merely making appropriate software changes (e.g., to the controller 28 control software) so as to add the additional facility of communicating with the newly installed modules and components.

The very same LAN 51 is also used to communicate between base stations in the preferred embodiment. Thus, the same generic bidirectional digital signal link used by controller 28 to communicate with interface module 50 is also used in the preferred embodiment to provide communications between internal components of base station 12 and components external to the base station. For example, trunking typically requires coordination between different base stations; LAN 51 may be used to convey trunking coordination messages between base stations 12, 12A, 12B, etc. Additionally (or alternatively), one or more single point monitoring and/or control facilities 70 may be connected to LAN 51. Such single point monitoring and/or control facilities 70 may be used, for example, to gather statistical and/or diagnostic information about overall operation of a multiple base station repeater system (e.g., all of base stations 12, 12A-12N), to perform centralized control, billing and/or monitoring functions (e.g., in the manner of a conventional central site controller), etc. Since various internal components within each base station 12 are directly connected to LAN 51, it is possible for such central point monitoring and/or control facilities 70 to communicate directly with any such internal component within any base station (thus providing enhanced flexibility and capabilities).

In the preferred embodiment, RF receiver 20 is a conventional radio frequency receiver operating on a selected RF receive frequency. RF receiver 20 receives RF signals from sending transceiver(s) 14a via RF antenna 26, modulates those received RF signals, and provides responsive received audio signals in its output 20a. RF transmitter 22 in the preferred embodiment is a conventional (e.g., relatively high power) RF transmitter having an audio input 22a. RF transmitter 22 produces an RF carrier at a desired frequency (e.g., using a conventional digital frequency synthesizer-type local oscillator), modulates the RF carrier with audio applied to audio input 22a, and amplifies the modulated signal before transmitting the RF signal to receiving transmitter(s) 14b via RF antenna 26. In the preferred embodiment, conventional combiner 24 is used to provide isolation between the received and transmitted RF frequencies at repeater base station 12 to operate at full duplex mode (i.e., such that the signal transmitted by repeater base station does not degrade the sensitivity of or otherwise interfere with simultaneously reception of incoming receive channel RF signals).

In the preferred embodiment, the audio output signal provided by RF receiver 20 at output 20a is provided to CTCSS signal decode filter 30 and also to digital signal processing block 34. CTCSS signal decode filter 30 in the preferred embodiment removes speech signals from the received audio signals and outputs only signal components within the range below about 300 Hz to controller 28. Digital signal processing block 34, on the other hand, includes an internal highpass filter that removes such subaudible signal components from the received audio and may then further process the remaining speech signals (through compression and/or limiting the like so as to increase intelligibility and remove noise) for passing the speech signals an input of a summer 36. The other input of summer 36 is connected to receive the output of CTCSS signal and encode filter 32. Signal encode filter 32 receives periodic, roughly sinusoidal tone signal waveforms generated directly by controller 28 in the preferred embodiment and filters out frequency components of these tone signals that are within the speech band. The resulting filtered tone signals are provided to summer 36. The output of summer 36 is applied to the RF transmitter audio input 22a for modulating the transmitter RF output signal. Details relating to CTCSS signal encode and decode may be found in copending commonly-assigned U.S. patent application Ser. No. 07/596,357 entitled "A Full Duplex RF Repeater/Base Station Providing Microprocessor-Controlled Simultaneous CTCSS Tone Encode/Decode" now abandoned, which is incorporated by reference.

In the preferred embodiment, RF receiver 20 and RF transmitter 22 are digitally controlled (and also monitored) by controller 28. Controller 28 in the preferred embodiment executes prestored software routines involving various parameters of RF receiver 20 and RF transceiver 22 such as, for example, RF transmit and receive frequencies, RF transmitter key and unkey, RF transmitter power level, RF received sensitivity, etc. While some such control signals are provided in the preferred embodiment over dedicated signal links 28a, 28b, other such control signals are provided to transmitter 22 and receiver 24 via LAN 51 and interface module 50 in the preferred embodiment. In particular, the preferred embodiment controller 28 controls transmitter 22 RF power output, transmitter operating frequency and receiver 20 operating frequency by passing digital messages over LAN 51 to interface module, and also receives signals indicating status of the receiver and the transmitter via the LAN from the interface module. In one configuration, controller 28 also may communicate bidirectionally with a modem 48 via LAN 51 and interface module 50.

Figure 2A:
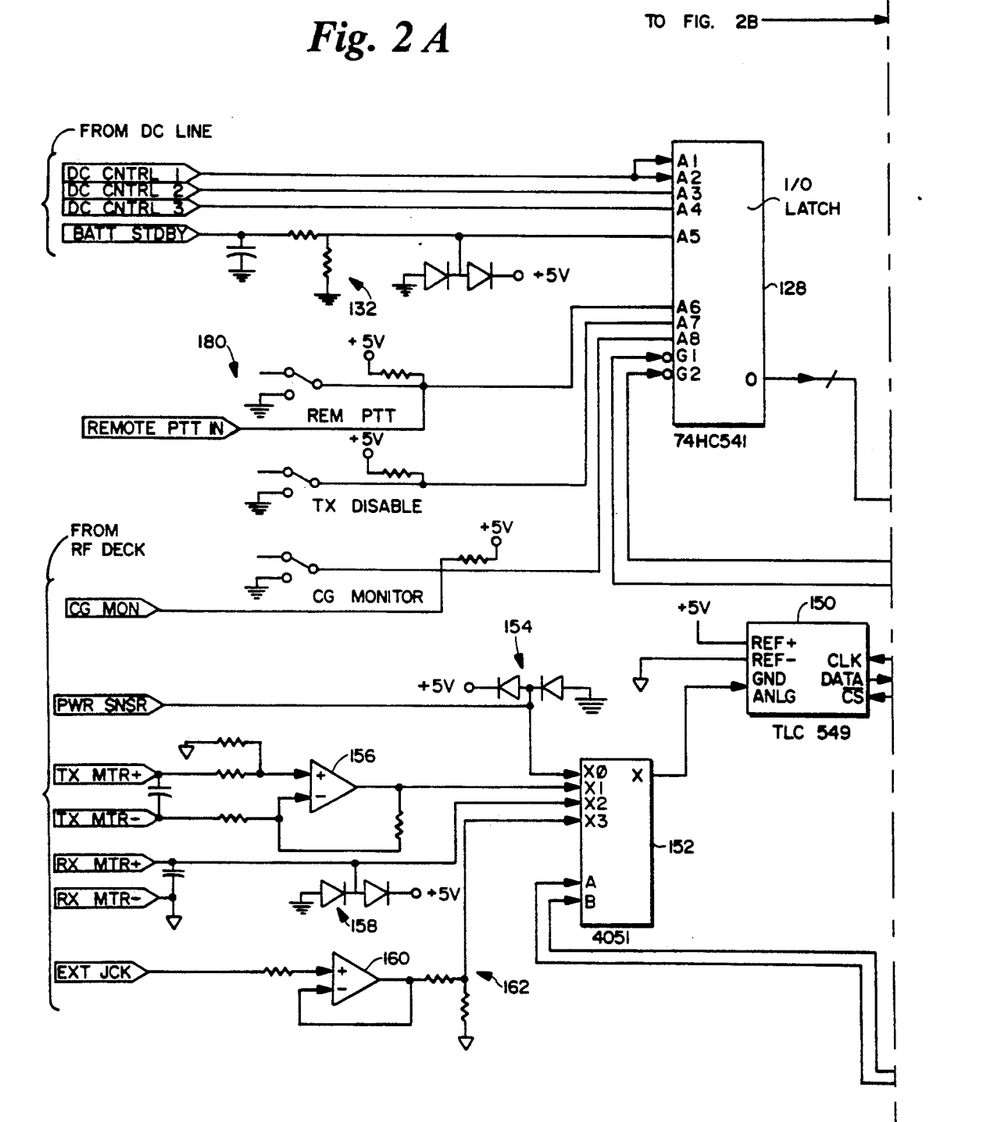
FIGS. 2A, 2B and 2C together are a detailed schematic diagram of digital portions of the base station controller block shown in FIG. 1.
Figure 2B:
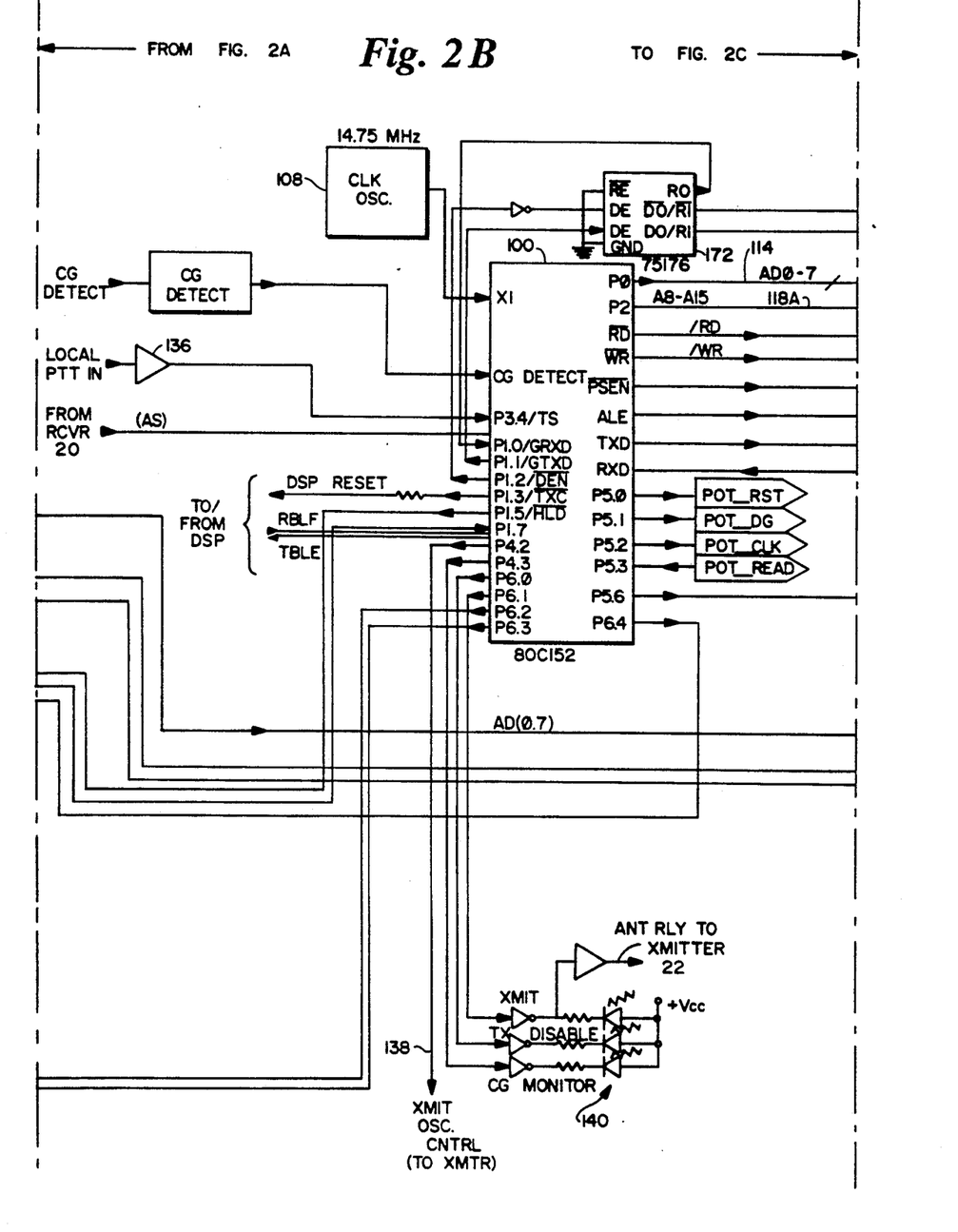
Figure 2C:
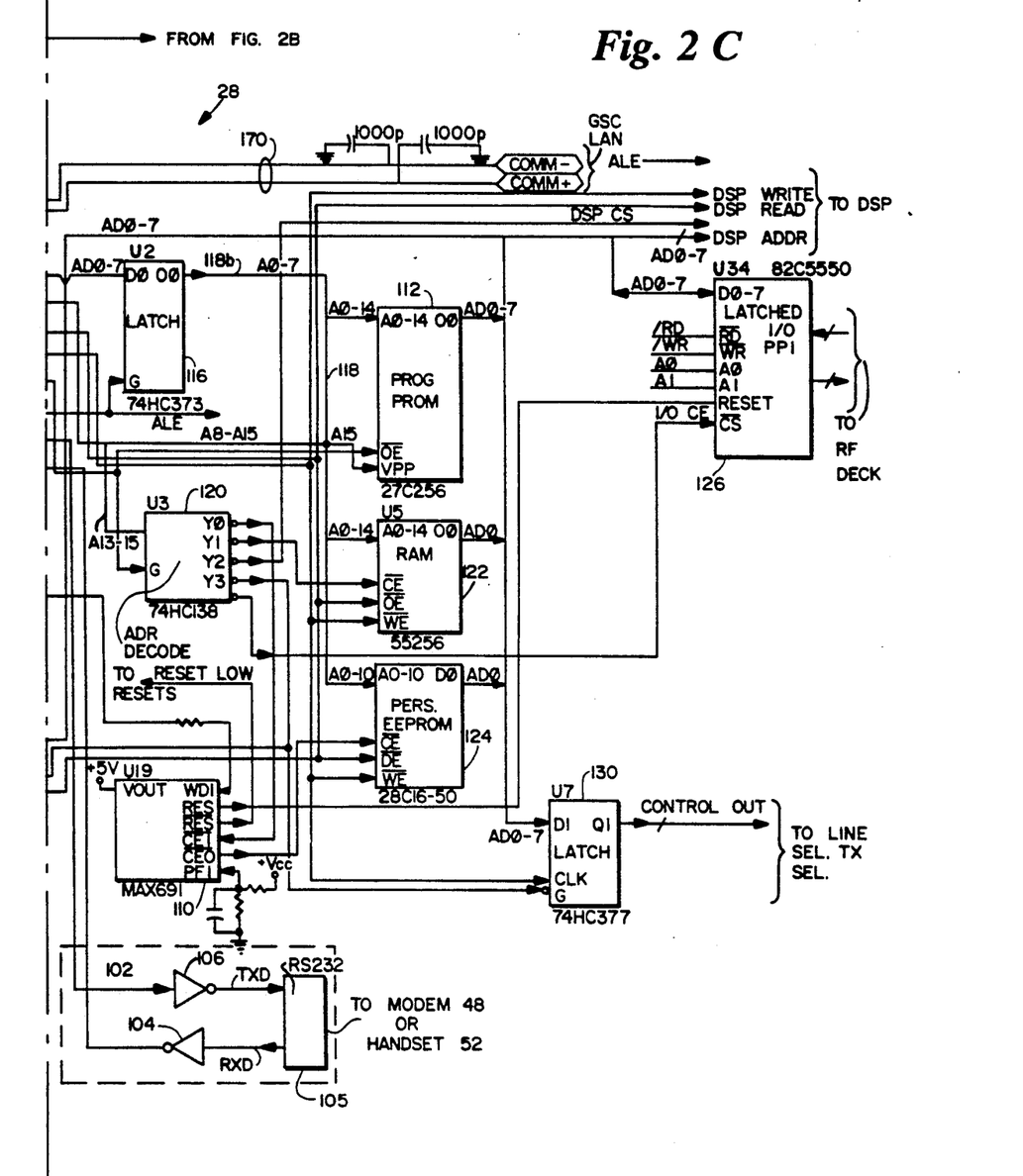

FIGS. 2A-2C together are a detailed schematic diagram of an exemplary architecture for controller shown in FIG. 1. Controller 28 contains a microprocessor and associated digital circuitry for control purposes, and also includes analog circuitry for audio signal conditioning, routing and level adjustment. The heart of controller 28 is an Intel 80C152 microprocessor 100. This microprocessor 100 includes, among other features, an internal RAM and an internal UART directly supporting RS-232C data communications, and additional hardware components directly supporting GSC communications (see Intel publications relating to the 80C152 for additional details regarding such GSC communications).

Microprocessor 100 is driven by a conventional 14.75 MHz clock oscillator 108. A power on/manual reset circuit 110 is provided to initialize the program code and hardware of controller 28 (including microprocessor 100). Circuit 110 (which is built around a conventional MAX691 integrated circuit) monitors the +5VDC power line and outputs a low-going pulse on the /RESET line as well as a high-pulse on the /RES line) when the monitor voltage is below 4.5 volts. Circuit 110 also includes a conventional watchdog timer; microprocessor 100 must periodically poll the WD1 input of circuit 110 or the circuit 110 will generate a reset.

Microprocessor 100 obtains its program control instructions from PROM 112 (which may be either 32K or 64K in the preferred embodiment). The lower eight bits of address coming from a microprocessor multiplexed address/data bus 114 are latched by an address latch 116 in response to an ALE output generated by the microprocessor. The upper eight bits of address (A8-A15) contain only address information and are provided via a dedicated 8-bit wide address bus 118a directly to devices requiring additional address lines.

An address decoder 120 decodes the three most significant bits (A13-A15) of address bus 118a to select one of eight 8K-byte blocks of data (non-program) memory. The PSEN output generated by microprocessor 100 is used to disable decoder 120 during access to program PROM 112. In the preferred embodiment, the following devices are mapped to an 8K-byte block of data memory:

0000-1FFFH EEPROM 124
    2000-3FFFH RAM 122
    4000-5FFFH Digital Signal Processor
    6000-7FFFH Input/Output Latches
    8000-9FFFH 82C54 Counter Timer (not shown)
    A000-BFFFH 82C55 Programmable Peripheral Interface 126

A static RAM 122 and a personality EEPROM 124 are provided as memory to microprocessor 100 in addition to the program PROM. Remote control station 50 has read/write access to these devices on a location level, as will be explained. Microprocessor 100 may store data in RAM 122 and read from RAM device 122 (although all data is lost at power off). RAM 122 input receives a latched address output generated by microprocessor 100 when the chip enable output signal CE generated by address decoder 120 goes low. If the RAM's OE input (generated by the microprocessor as a RD signal) goes low and RAM 122 is addressed and enabled, the RAM outputs the data contained at the specified address onto multiplex address/data bus 114. If, on the other hand, microprocessor 100 asserts the WR line low while addressing RAM 122, the RAM stores the data present on bus 118b into the location specified on the address bus.

Personality information is stored in personality EEPROM 124. Data can be written from and read to from this EEPROM device 124 and data stored in it is not lost on power off. The EEPROM 124 inputs the address from address bus 118b when the microprocessor receives the RD line active low. The chip enable CE of personality EEPROM 124 is generated by address decoder 120, but is routed through circuit 110 (CE1,CE0) to ensure that the EEPROM is disabled when a reset condition exists (i.e., to ensure that no extraneous writes occur to the EEPROM during powerup or brown out conditions). Personality EEPROM 124 can be read from and written to by microprocessor 100 depending upon the state of the microprocessor WR output line.

Microprocessor 100 is also capable of loading electronic potentiometers (not shown) via audio level-adjusting lines labeled POT_RST, POT_DQ, POT CLK, and POT_READ. In the preferred embodiment, microprocessor 100 serially loads electronic potentiometers 194,196 simultaneously. To provide such electronic potentiometer loading, the microprocessor sets the POT_RST line high—thus having the effect of enabling the electronic potentiometers' loading circuitry. Microprocessor 100 outputs serial data on line POT_DQ and clocks the data into the electronic potentiometers via a clock signal asserted by the microprocessor on line POT_CLK. In the preferred embodiment, the various electronic potentiometers are connected in series and include internal shift registers. Thus, the electronic potentiometers are strung together to provide a serial word length (seventeen bits in the preferred embodiment) that is a multiple of the word length required to control each individual electronic potentiometer. In the preferred embodiment, microprocessor 100 may also read back data stored in the electronic potentiometers 194,196 by asserting the line POT READ, providing clocking signals on the line POT-CLK, and receiving the data on the POT_DQ line.

Controller 28 further includes a programmable peripheral interface 126 (an Intel 82C55 in the preferred embodiment) to provide additional I/O ports. This programmable peripheral interface (PPI) 126 is used in the preferred embodiment to receive status signals and to apply control signals to RF receiver 20 and RF transmitter 22. For example, some of the outputs of PPI 126 select operating channels for RF receiver 20 and RF transmitter 22, while other outputs generate various push-to-talk signals, tone detect/generation, enable/disable signals, voice enable/disable signals, etc. The inputs and outputs of PPI 126 are appropriately RF decoupled as required and are buffered (e.g., with pull-up resistors and active buffers). In some cases, dual diodes are included to prevent over/under voltage conditions, and level shifting may be accomplished using transistors (e.g., to convert the signal to CMOS logic levels where necessary).

Controller 28 also includes an analog-to-digital (A/D) converter 150 used to meter DC levels. An analog multiplexer 152 selects between four different external metering inputs: RF power output (present on the PWR SNSR line) to antenna 26; transmitter power amplifier input current (a differential signal provided by RF transmitter 22 on lines TX MTR+ and TX MTR−); received signal strength (provided by RF receiver 20 on differential lines RX MTR+ and RX MTR−); and an auxiliary metering line available on EXT JCK.

The PWR SNSR input will accommodate a DC level between 0 and 5VDC (positive) relative to analog ground. This input is protected from over-voltage conditions by dual diode network 154 in the preferred embodiment. Amplifier 156 connected to the transmitter metering output removes any common mode voltage and provides a single-ended output to MUX 152. The RX MTR lines are assumed to carry a voltage level between 0 and +5VDC relative to analog ground, so no additional signal conditioning is performed (other than over-voltage protection provided by dual diode network 158). The EXT JCK input is designed to accommodate input signals between zero and +10VDC relative to analog ground. An operational amplifier 160 provides a high input impedance and buffers the input signal before applying it via voltage network 162 to analog MUX 152.

Analog MUX 152 gates one of these four inputs to A/D converter 150 in response to select signals provided by microprocessor 100. Microprocessor 100 also exercises control directly on the CS line of A/D converter 150 to select the converter. When the A/D converter is selected, it provides eight bits of conversion data one bit at a time on its DATA output line (which is directly read by microprocessor 100 in the preferred embodiment and stored into a location in RAM 122. Successive data bits are clocked out of A/D converter 150 by the microprocessor asserting clocking signals onto the A/D converter CLK input line. In the preferred embodiment, one or more locations of RAM 122 are set aside for each of the four converted MUX 152 inputs (so that one such location corresponds to sampled RF power output, control location corresponds to sampled transmitter power input, a further location corresponds to sampled received signal strength, and a still further location corresponds to the external meter parameter. These locations may be directly read from by remote control station 50 at any time, and thus give the remote control station access to the latest metered values.

The preferred embodiment controller 28 is designed to accommodate an optional digital signal processor 34 daughter board which may be required in certain installations. See copending commonly-assigned application Ser. No. of entitled "Digital Signal Processor For Radio Base Station" that is incorporated by reference.

In the presently preferred embodiment, not all control signals between controller 28 and the RF section 20,22 are communicated via LAN 51; some control signals are input or output to receiver 20 and transmitter 22 directly (i.e., not over LAN 51) by microprocessor 100 in the preferred embodiment. For example, in some configurations microprocessor 100 may select between different previously preset operating frequencies for RF transmitter 22 and RF receiver 20 by providing control outputs to the PPI 126. In addition, a transmit oscillator enable signal is generated by microprocessor 100 on lines 138 (this signal is used to "key" the RF transmitter), and microprocessor 100 directly controls and a transmit antenna relay. ANT RLY is activated by microprocessor 100 (having the effect of lighting the transmit indicator LED and also coupling the output of the RF transmitter 22 to combiner 24). Fifteen milliseconds later, microprocessor 100 keys the transmitter 22 by asserting the XMIT OCS CNTRL line 138 high (this line may be buffered/level shifted by a transistor network not shown before being applied to the RF transmitter 22 exciter oscillator). Similarly, the carrier sense input CAS 139 is used by microprocessor 100 to monitor received carrier activity by receiver 20.

However, in accordance with an important aspect of the present invention, a high-speed serial interface 170 is also provided within base station 12 to permit controller 28 to communicate, e.g., indirectly with receiver 20 and transmitter 22 (i.e., via interface module 50). This high-speed serial interface is used to transfer data bidirectionally over a LAN 51 (which in the preferred embodiment comprises an RS-485 differential pair made up of COMM+,COMM−). A type 75176 serial bidirectional driver 172 is used to communicate data over this high-speed interface. Thus, control signals are also communicated between controller 28 and receiver 20, transmitter 22 (the receiver and transmitter together comprise an RF section) via LAN 51 and interface module 50.

Figure 3:
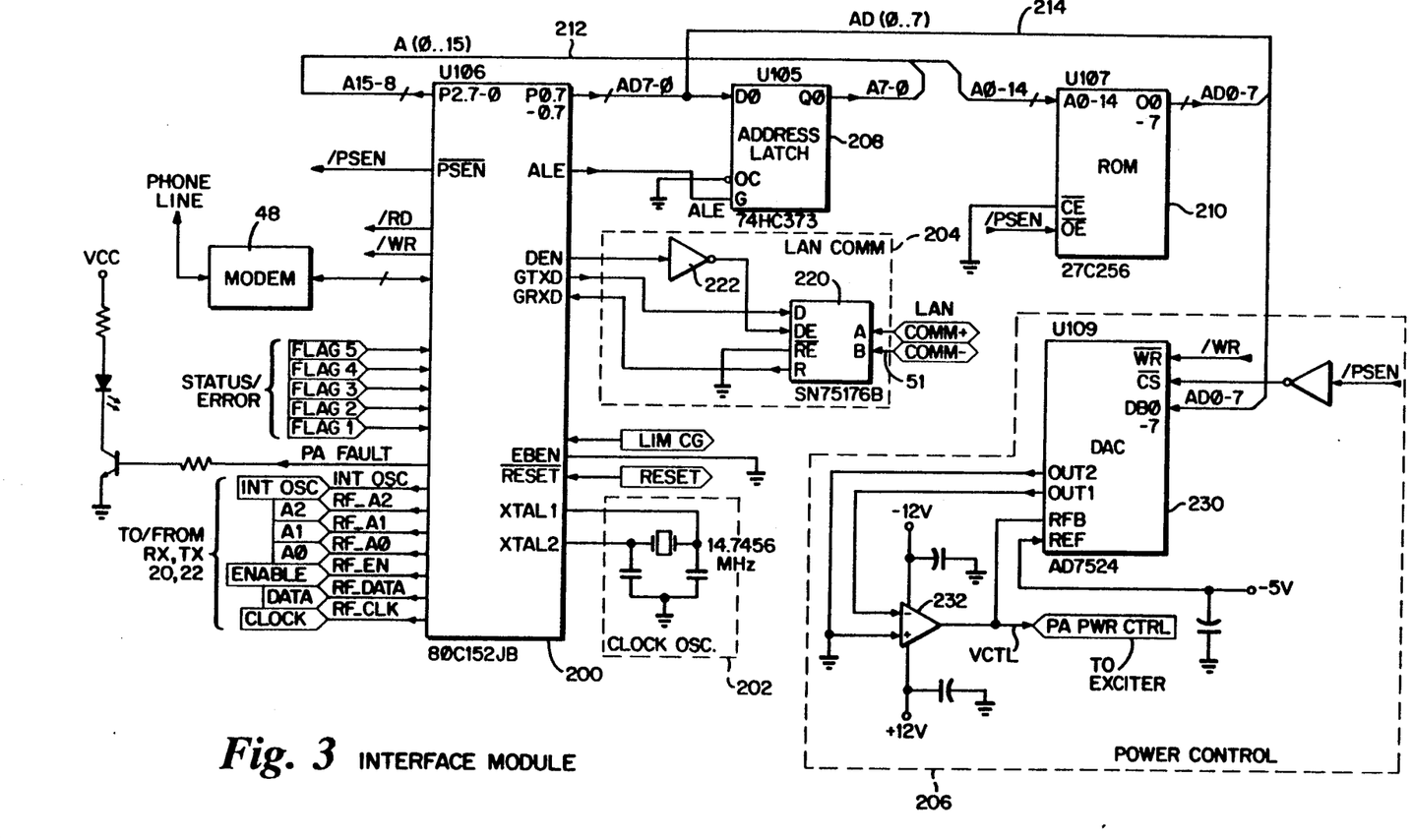
FIG. 3 is a detailed schematic diagram of the interface module shown in FIG. 1.

FIG. 3 is a schematic diagram of the presently preferred exemplary embodiment interface module 50 shown in FIG. 1. As described above, interface module 50 connects with base station controller 28 via LAN 51, and provides control signals to RF receiver 20 and RF transmitter 22. In the presently preferred exemplary embodiment, interface module 50 comprises a module or board which is separate from the module or board on which RF receiver 20 and RF transmitter 22 are disposed, and the interface module is connected to the RF transmitter and RF receiver via multiple parallel connections 53). Sufficient RF shielding and RF decoupling is preferably provided to isolate interface module 50 from the RF circuits of receiver 20 and, especially, transmitter 22.

Referring specifically now to FIG. 3, interface module 50 includes an Intel 80C152JB microcontroller 200, a clock oscillator 202, a LAN communications block 204, a power control block 206, an address latch 208, a program ROM 210, an address bus 212, and a multiplexed address/data bus 214. In the preferred embodiment, address bus 212 is sixteen bits wide, and multiplexed address/data bus 214 is eight bits wide. Address latch 208 is used to latch the lower eight bits of address bus 212 (which microcontroller 200 asserts on the multiplexed address/data bus 214). Program store 210 accepts a 15-bit address, and provides 8-bit instructions for execution by microcontroller 200. Clock oscillator 202 provides a 14.7456 MHz clock signal to microprocessor 200. Controller 200 provides /RD, /WR, PSEN and ALE signals to enable reading to and writing from address latch 208, ROM 210 and power control block 206.

In the preferred embodiment, LAN communications block 204 is similar to corresponding communications components described in connection with FIG. 2B, in that it includes a bidirectional RS-485 serial driver 220 (type 75176) corresponding to driver 172 shown in FIG. 2B. An inverter 222 is used to provide clocking/enable control signals from controller 200 to driver 220. Driver 220 is operated by controller 200 in accordance with the Intel GSC serial protocol as built into the Intel 80C152JB controller chip. In the preferred embodiment, interface module microprocessor 200 communicates with microprocessor 100 of base station 28 over LAN 51 using the GSC serial communications protocol and the conventional RS-485 multipoint communication architecture.

Power control block 206 provides a power control signal VCTL to the exciter of transmitter 22 in response to a digital value provided by microprocessor 200. Controller 200, in turn, receives this digital value over LAN 51 from base station controller 28. In the preferred embodiment, power control block 206 includes a digital-to-analog converter (DAC) 230 which receives a value from microprocessor 200 via address/data bus 214, and converts that 8-bit value into an analog output signal on lines OUT1,OUT2. These output signals on lines OUT1,OUT2 are amplified by a differential amplifier 232 to provide a variable voltage power control signal VCTL to transmitter 22.

Interface module 50 also interacts with RF receiver 20 and RF transmitter 22 via the status/error signal it receives on lines FLAG1-FLAG5; the RF synthesizer loading signals ENABLE data and CLOCK; additional control signals INT OSC, A1,A2 and A0.

Figure 4:
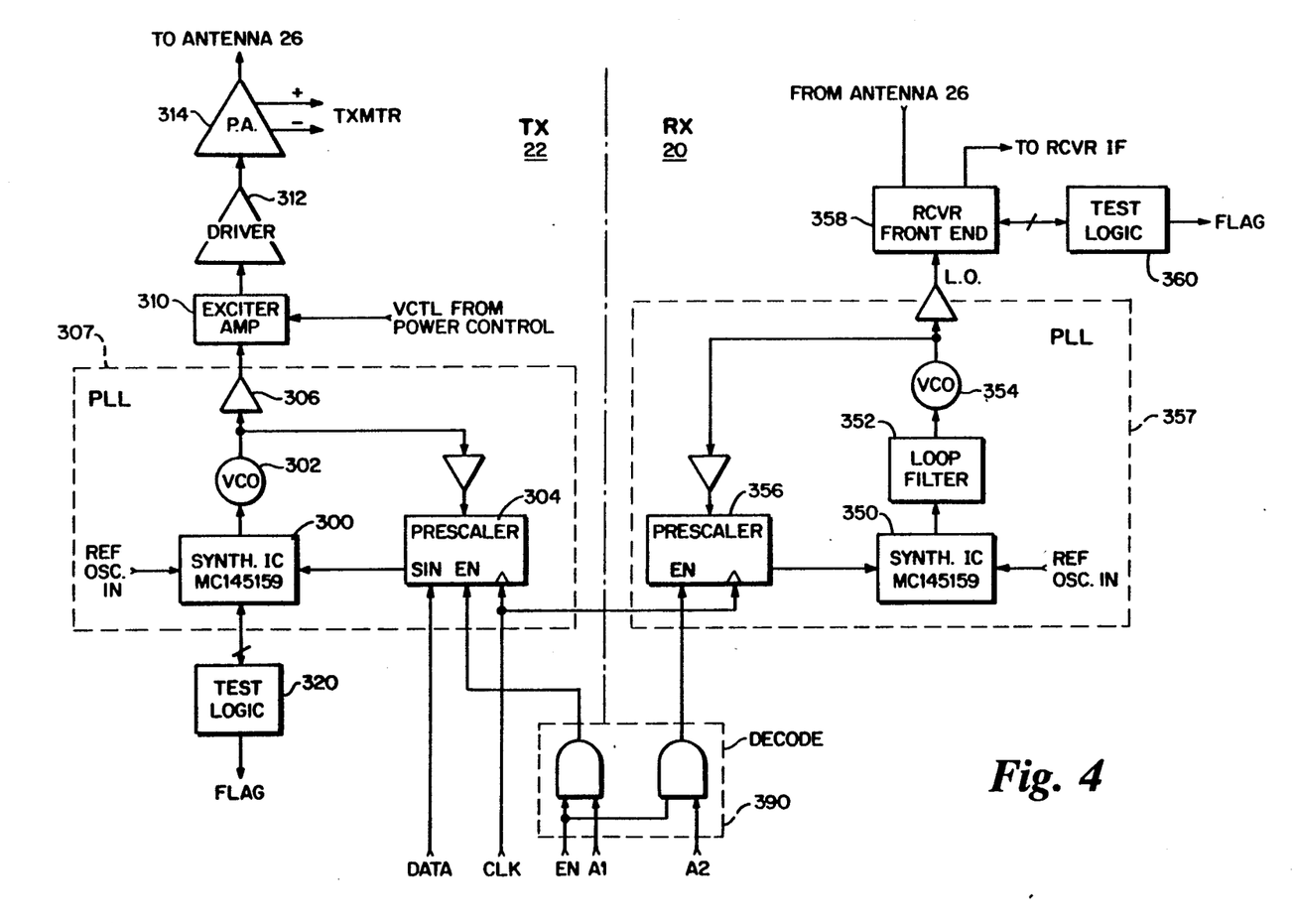
FIG. 4 is a schematic block diagram of portions of the RF receiver and RF transmitter that are controlled by the FIG. 3 interface module.

FIG. 4 is a schematic block diagram of portions of RF transmitter 22 and RF receiver 20 that interact with interface module 50. RF transmitter 22 includes a conventional programmable frequency synthesizer 300, VCO 302 and prescaler 304 which together form a conventional phase lock loop (PLL) 307 local oscillator. The output of VCO 302 is provided via a buffer 306 to an exciter amplifier 310. Exciter amplifier 310 amplifies the local oscillator signal produced by PLL 307 to provide an output signal to driver amplifier 312 and, eventually, to power amplifier 314 and antenna 26. In the preferred embodiment, the power control signal VCTL is applied by interface module 50 to exciter amplifier 310. This power control signal varies the gain of exciter amplifier 310—thus providing the ability to vary the RF power provided by RF transmitter 22 to antenna 26.

In the preferred embodiment, base station controller 28 may specify this RF power output in a message it transmits to interface module 50 over LAN 51. Interface module microprocessor 200 receives and responds to this message by loading a new 8-bit value into DAC 230, thus varying the power control signal VCTL (and hence the gain of exciter amp 310).

RF receiver 20 as shown in FIG. 4 includes a conventional synthesizer IC 350, loop filter 352, VCO 354 and prescaler 356 which together provide a PLL 357 local oscillator. Receiver prescaler 356 and transmitter prescaler 304 each comprise a conventional programmable divider including serial (ship register) loading capabilities. In the preferred embodiment, these prescalers 304,356 are loaded by interface module microprocessor 200 via the ENABLE, DATA, and CLOCK signals generated by the controller 200. In the preferred embodiment, transmitter prescaler 304 and receiver prescaler 356 each have a serial input SIN connected to receive the serial data output provided on the DATA line by interface module 200. Prescalers 304, 356 each include an internal serial shift register which shifts in the serial data in response to the CLOCK and ENABLE signals. A decoding network 390 may be provided to receive some or all of selection signals A0–A2 from microprocessor 200 and to select one or the other of prescalers 304, 356 for loading (thus permitting the microprocessor 200 to independently load prescalers 304, 356).

To load prescaler 304, 356 in the preferred embodiment, microprocessor 200 merely provides a serial data output stream specifying desired contents of the prescaler and asserts appropriate combinations of signals A0–A2 to select the desired one of prescalers 304, 356. The contents of prescaler 304,356 control the division ratio within the transmitter PLL 307 and the receiver PLL 357—thus determine the operating frequencies of the transmitter and the receiver, respectively.

In the preferred embodiment, transmitter 22 includes a test logic block 320 which is coupled to synthesizer 300 (and possibly to other portions of the transmitter as well). Test logic block 320 comprises digital logic which monitors conventional status signals provided by synthesizer integrated circuit 300 and applies flag signals to some of the FLAG inputs of interface module microprocessor 200 indicating status and/or error conditions. Similarly, receiver 20 includes a test logic block 360 coupled to receiver front end 358 (e.g., this test logic block may be coupled to the RF amplifier stage and to the injection amplifier stage of the RF front end to detect receiver operating faults). Receiver test logic block 360 may also generate status and/or error signals for application to microprocessor 200 via FLAG inputs. Various different combinations of microprocessor 200 select signals A0–A2 may be decoded to select and/or enable test logic blocks 320, 360 if desired.

Figure 5A:
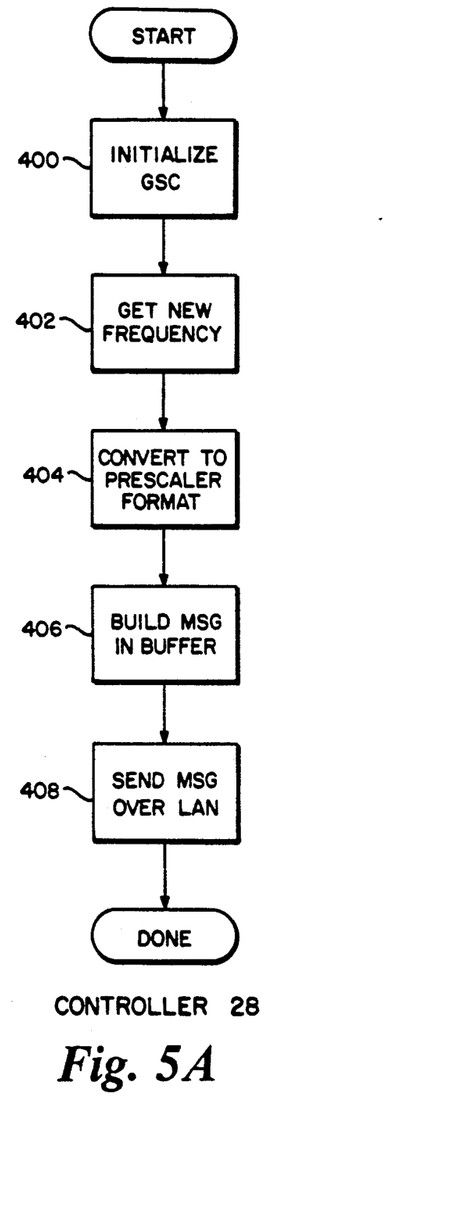
FIGS. 5A and 5B are schematic flowcharts of exemplary program control steps performed in the preferred embodiment.
Figure 5B:
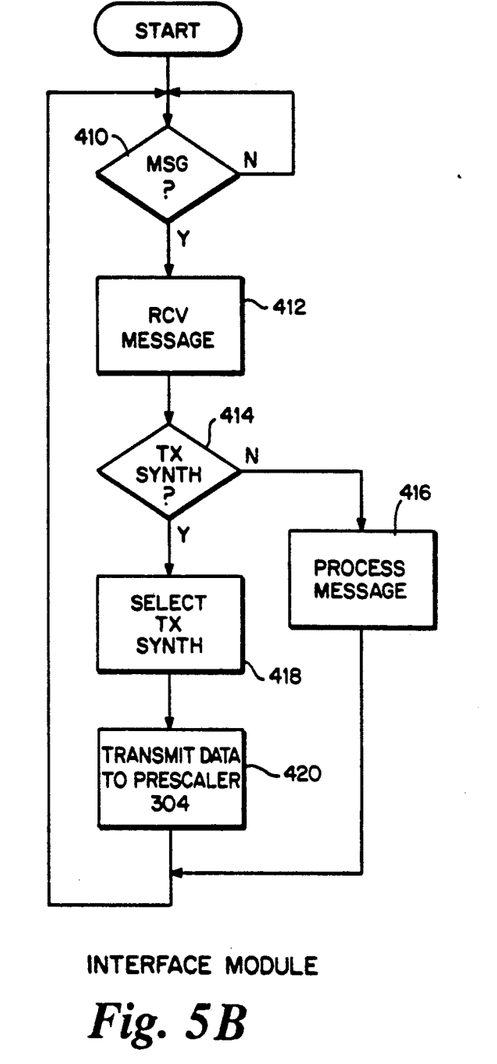

FIG. 5A is a flowchart of exemplary program control steps performed by base station microprocessor 100 to load the transmitter prescaler 304 (and thus set transmitter operating frequency), and FIG. 5B is a flowchart of exemplary program control steps performed by interface module microprocessor to accomplish this same task. While these flowcharts are not necessary for one of ordinary skill in this art to understand how controller 28 can control a further device via LAN 51, they are presented herein as one example of such control capabilities. Referring to FIG. 5A, the microprocessor 100 within controller 28 first initializes its internal GSC hardware (e.g., using a conventional Intel initialization routine) in order to set desired baud rate, slot number, and various other parameters (block 400). Microprocessor 100 then obtains the new transmitter operating frequency data and converts it into a format and value required by prescaler 304 (e.g., using a conventional lookup table stored in memory) (block 402, 404). Microprocessor 100 then uses this converted data to build a message in a temporary memory buffer (the message included the converted data, a predefined address of interface module 50, a further address portion indicating to the interface module that the transmitter frequency synthesizer is to be loaded, and possibly other information; block 406). Microprocessor 100 then sends the buffer contents over LAN 51 using conventional techniques recommended by Intel in its GSC specification (block 408).

Referring to FIG. 5B, microprocessor 200 within interface module 50 continually checks to determine whether a message for it is present on LAN 51 (block 410). If a message intended for it is present on LAN 51, the microprocessor 200 receives the message (placing it and other received messages in a buffer if necessary; block 412). Microprocessor 200 then decodes the received message to determine whether the message specifies loading of the transmitter frequency synthesizer (block 414). If transmitter frequency synthesizer loading not specified ("N" exit of decision block 414), microprocessor 100 processes the message in an appropriate manner (block 416). If transmitter synthesizer reloading is specified, however, microprocessor 200 selects the transmitter prescaler 304 (i.e., by asserting an appropriate combination of select signals A0-A2; block 418) and transmits the data contents of the received message directly to prescaler via the DATA, ENABLE and CLOCK lines discussed above (block 420). In the preferred embodiment, controller 200 thus simply provides the data to the prescaler in essentially the same form as it receives the data (and performs no substantial processing on the data in the preferred embodiment).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An RF base station system including:
    a first RF base station including:
        a first RF device, and
        a first digital control means for controlling said first RF device: a further RF base station including:
        a further RF device, and
        a further digital control means for controlling said further RF device; and
    a bidirectional multipurpose digital signal link providing communications between and within said first and further RF base stations, said link being coupled to each of said first RF device, said first digital control means, said further RF device, and said further digital control means, said link conveying digital control signals between said first digital control means and said first RF device, conveying digital control signals between said further RF device and said further digital control means, and conveying digital signals between said first and further digital control means.

2. A system as in claim 1 wherein said link comprises a local area network.

3. A system as in claim 1 wherein said link carries messages from said first control means to said first RF device specifying a RF operating frequency for said first RF device.

4. A system as in claim 1 wherein said link carries messages specifying an RF power output for said first RF device.

5. An RF base station system including:
    first and second digital controllers,
    a first RF transceiver associated with and controlled by said first digital controller,
    a second RF transceiver associated with and controlled by said second digital controller, and
    a multipoint digital signal link coupled to said first digital controller at a first point, said second digital controller at a second point, said first RF transceiver at a third point, and said second RF transceiver at a fourth point, said multipoint digital control link capable of communicating digital control messages to any of said first and second digital controllers and to any of said first and second RF transceivers.
    wherein said system further includes a received signal strength (RSSI) indicating means coupled to said link, said RSSI indicating means generating RSSI digital messages indicating received RF signal strength and applying said RSSI digital messages to said link.

6. An RF base station system including:
    first and second digital controllers,
    a first RF transceiver associated with and controlled by said first digital controller,
    a second RF transceiver associated with and controlled by said second digital controller, and
    a multipoint digital signal link coupled to said first digital controller at a first point, said second digital controller at a second point, said first RF transceiver at a third point, and said second RF transceiver at a fourth point, said multipoint digital control link capable of communicating digital control messages to any of said first and second digital controllers and to any of said first and second RF transceivers.
    wherein:
        said system further includes an encryption/decryption device for encrypting and/or decrypting digital signals; and
        said link exchanges digital signals between said encryption/decryption device and at least one of said first and second RF transceivers.

7. An RF base station system including:
    first and second digital controllers,
    a first RF transceiver associated with and controlled by said first digital controller,
    a second RF transceiver associated with and controlled by said second digital controller, and
    a multipoint digital signal link coupled to said first digital controller at a first point, said second digital controller at a second point, said first RF transceiver at a third point, and said second RF transceiver at a fourth point, said multipoint digital control link capable of communicating digital control messages to any of said first and second digital controllers and to any of said first and second RF transceivers.
    wherein said first and second transceivers provide channel trunking in response to trunking control signals passed over said link.

8. An RF base station system including:
    first and second digital controllers,
    a first RF transceiver associated with and controlled by said first digital controller,
    a second RF transceiver associated with and controlled by said second digital controller, and
    a multipoint digital signal link coupled to said first digital controller at a first point, said second digital controller at a second point, said first RF transceiver at a third point, and said second RF transceiver at a fourth point, said multipoint digital control link capable of communicating digital control messages to any of said first and second digital controllers and to any of said first and second RF transceivers,
    wherein said system further includes a central point monitoring node coupled to said link, said link exchanging digital signals between at least (i) said first and second controllers and (ii) said central point monitoring node.

9. An RF base station transceiving system comprising:
    (a) a first digital controller and associated first RF transceiver;

(b) a second digital controller and associated second RF transceiver;
(c) at least one further digital device; and
(d) a multipoint local area network means coupled to said first digital controller, said first RF transceiver, said second digital controller, said second RF transceiver, and said further digital device, said local area network means for:
   (a) communicating digital messages between said first digital controller and said first RF transceiver,
   (b) communicating digital messages between said second digital controller and said second RF transceiver, and
   (c) communicating digital messages between (i) said further digital device and (ii) said first and second digital controllers, wherein said further digital device comprises a single point monitor.

10. An RF base station transceiving system comprising:
(a) a first digital controller and associated first RF transceiver;
(b) a second digital controller and associated second RF transceiver;
(c) at least one further digital device; and
(d) a multipoint local area network means coupled to said first digital controller, said first RF transceiver, said second digital controller, said second RF transceiver, and said further digital device, said local area network means for:
   (a) communicating digital messages between said first digital controller and said first RF transceiver,
   (b) communicating digital messages between said second digital controller and said second RF transceiver, and
   (c) communicating digital messages between (i) said further digital device and (ii) said first and second digital controllers.

wherein said network means communicates frequency selection messages from said first digital controller to said first RF transceiver, and communicates trunking messages between said further digital device and said first digital controller.

* * * * *